United States Patent
Suzuki et al.

(10) Patent No.: US 8,729,813 B2
(45) Date of Patent: May 20, 2014

(54) SWITCHING POWER SUPPLY DEVICE AND LIGHT-EMITTING DIODE LIGHTING DEVICE

(71) Applicant: Minebea Co., Ltd., Nagano (JP)

(72) Inventors: Masataka Suzuki, Nagano (JP); Yoshihiro Nakamura, Nagano (JP); Hideharu Kanamitsu, Nagano (JP); Hiroshi Imada, Nagano (JP)

(73) Assignee: Minebea Co., Ltd., Nagano ( * ) Notice: Subject to any disclaimer, the term of this patent is extended or adjusted under 35 U.S.C. 154(b) by 29 days.

(21) Appl. No.: 13/721,849

(22) Filed: Dec. 20, 2012

(65) Prior Publication Data

US 2013/0162157 A1 Jun. 27, 2013

(30) Foreign Application Priority Data

Dec. 26, 2011 (JP) ................................. 2011-283528

(51) Int. Cl.
*H05B 37/02* (2006.01)

(52) U.S. Cl.
USPC ........... 315/219; 315/224; 315/247; 315/308; 363/16

(58) Field of Classification Search
USPC ............. 315/224, 219, 307, 308, 291, 185 R, 315/246, 247; 363/74, 75, 97, 89, 16
See application file for complete search history.

(56) References Cited

U.S. PATENT DOCUMENTS

| 5,991,181 A * | 11/1999 | Fujii et al. .................... 363/97 |
| 8,212,493 B2 * | 7/2012 | Melanson et al. ............ 315/247 |
| 2011/0181196 A1 * | 7/2011 | Kang et al. .................... 315/246 |

FOREIGN PATENT DOCUMENTS

| JP | 2001-313423 A | 9/2001 |
| JP | 2010-092844 A | 4/2010 |
| JP | 2010-093874 A | 4/2010 |

* cited by examiner

*Primary Examiner* — David H Vu

(57) ABSTRACT

Implemented are a switching power supply device and a light-emitting diode lighting device in which a variation in load current can be suppressed against a wide range of variation in AC voltage. The configuration of the switching power supply device and the light-emitting diode lighting device includes: a rectifier unit which rectifies AC input voltage and outputs pulsating-current voltage; a power converting unit which receives the pulsating-current voltage and supplies a predetermined load current to a load; a current detecting unit which detects the load current; a drive control unit which controls the power converting unit to regulate the load current to a constant level; and an input voltage detecting unit which detects a variation in the AC input voltage. The drive control unit controls the power converting unit depending on the variation in the AC input voltage detected by the input voltage detecting unit.

10 Claims, 5 Drawing Sheets

SWITCHING POWER SUPPLY DEVICE AND LIGHT-EMITTING DIODE LIGHTING DEVICE

BACKGROUND OF THE INVENTION

1. Field of the Invention

The present invention relates to a switching power supply device used to drive a load (for example, light-emitting diode) by use of given current and to a light-emitting diode lighting device using the same, and more particularly to a switching power supply device and a light-emitting diode lighting device in which constant DC output current is provided against a wide range of variation in AC input voltage.

2. Description of the Related Art

In ordinary light emitting conditions, light-emitting diodes (hereinafter referred to as an LED) have current-voltage characteristics which have a small variation in forward voltage drop against a variation in drive current. Accordingly, LEDs are usually driven by a power supply device with constant current control. As such power supply device, a switching power supply device is usually used so that power consumption is reduced.

As the switching power supply device with constant current control, Japanese Patent Laid-Open No. 2001-313423 (Patent Document 1) discloses a switching power supply device in which DC voltage obtained by rectifying and smoothing AC input voltage is regulated by a switching regulator and the resultant DC voltage is used to drive a load such as an LED. In this switching regulator, the drive current of the LED is detected and feedback-controlled so that the drive current is regulated to a predetermined level; and the reference voltage used to set the drive current is adjusted, whereby the luminance of the LED is adjusted.

Further, in this switching power supply device, the product of the DC voltage (DC input voltage of the switching regulator unit) produced from AC input voltage and the drive current is compared to the current flowing in the switching element of the switching regulator unit; as a result, switching pulses can be stopped. Thus, when the current flowing in the switching element increases due to reduction in AC input voltage or other reasons, the switching operation is terminated to prevent the switching element from being damaged.

In a switching power supply device disclosed by Japanese Patent Laid-Open No. 2010-093874 (Patent Document 2), also, AC input voltage is rectified and an LED is driven by a switching regulator. In this switching power supply device, also, feedback control is performed so that the LED drive current is regulated to a predetermined constant level. In addition, when the drive current cannot be regulated to a predetermined constant level due to reduction in AC input voltage or other reasons, the drive current is reduced so that the LED is driven at an allowable low luminance and at the same time, the output voltage is detected so that overvoltage is prevented from being applied to the LED.

In a switching power supply device disclosed by Japanese Patent Laid-Open No. 2010-092844 (Patent Document 3), also, AC input voltage is rectified and an LED is driven by a switching regulator. In this switching power supply device, when the LED is operated to emit light of a high luminance (that is, when the LED is driven in an ordinary manner), feedback control is performed so that the drive current is regulated to a determined level; but, when the LED cannot be operated to emit light of a high luminance (for example, when AC input voltage becomes excessively low), feedback control is performed so that the drive voltage is regulated to a predetermined level, whereby light of an allowable low luminance is emitted. In other words, this switching power supply device usually operates as a constant-current power supply, but operates as a constant-voltage power supply when the LED is operated to emit light of a low luminance. In this way, the LED is driven depending on the situation of AC input voltage or the like.

[Patent Document 1] Japanese Patent Laid-Open No. 2001-313423
[Patent Document 2] Japanese Patent Laid-Open No. 2010-093874
[Patent Document 3] Japanese Patent Laid-Open No. 2010-092844

Loads having drive current vs. drive voltage characteristics like those of LEDs are typically driven by constant current. Such constant-current drive is usually performed by feedback control (for example, refer to Patent Documents 1 to 3); in this case, when the magnitude of variation of DC output current relative to the variation of AC input voltage and the like is small, the power supply device is considered to have a high stability (hereinafter, also referred to as power supply stability).

Power supply stability increases when the gain of the feedback control system is raised; but, as the gain is increased, the stability of the feedback control system becomes lower (that is, there is a trade-off between the power supply stability and the stability of the feedback control system). Consequently, switching power supply devices are designed so that a predetermined power supply stability is implemented with respect to an allowable range of variation (for example, from +10% to −10%) of AC input voltage from a commercial power line (for example, AC 100V).

As described above, Patent Document 1 discloses a technique of preventing the switching elements from being damaged by reduction or the like in AC input voltage; Patent Document 2 discloses a technique by which the drive current is varied in an allowable range depending on a variation or the like of AC input voltage; Patent Document 3 discloses a technique of performing selection among constant current drive and constant voltage drive depending on a variation or the like of AC input voltage. Thus, Patent Documents 1 to 3 disclose a technique of applying constant-current drive to a load, but any of them does not disclose a technique of raising the power supply stability against a wide range of variation in AC input voltage.

The AC voltage of commercial power line varies according to countries and regions (for example, there are 100V systems (100V, 110V, 115V and the like) and 200V systems (200V, 220V, 230V and the like)). When a switching power supply device designed for AC input voltage of 100V (the range of variation in input voltage being +10% to −10% (totally 20%)) is operated using AC input voltage of 230V (withstand voltage being taken into consideration), the rate of variation of AC input voltage is 130% (230−100=130V), which is greater than six times the variation of 20%, and thus the variation of current supplied to LEDs is also greater than six times; consequently, the power supply stability is lower than one sixth, which is a problem.

In order to prevent this problem, switching power supply devices must be provided for each 100V-system market or for each 200V-system market. This increases design cost, manufacturing cost, maintenance-parts cost and the like. To address this problem, the present invention has an object to implement a switching power supply device which can achieve a satisfactory power supply stability against a wide range of variation in AC input voltage.

SUMMARY OF THE INVENTION

To address the above described problem, a switching power supply device according to the present invention includes a rectifier unit which rectifies AC voltage received from an AC power line and outputs pulsating-current voltage; and power obtained by the rectifier unit is converted into DC power by a power converting unit, and the DC power is supplied to a load. Further, in the switching power supply device, a current detecting unit detects load current (DC output current) flowing in the load, and a drive control unit controls the power converting unit according to the load current, whereby the load current is regulated to a predetermined level (that is, the switching power supply device operates as a constant-current supply). Accordingly, the switching power supply device can suppress a variation in the load current caused by a variation in the resistance value of the load or the like (that is, what is called "load regulation" is improved).

The switching power supply device further includes an input voltage detecting unit which detects a variation in the AC voltage; thus, the drive control unit can perform drive control of the power converting unit according to a variation in AC input voltage detected by the input voltage detecting unit. Accordingly, even when the AC input voltage varies over a wide range, the switching power supply device can also suppress a variation in the load current caused by the variation in the AC input voltage (that is, what is called "line regulation" is improved).

In this way, in the switching power supply device, load regulation and line regulation are improved; thus, a variation in the load current can be suppressed over a wide range of AC input voltage (for example, voltages of 100V system to 200V system).

The power converting unit includes an insulation transformer; a switching element performs switching of current flowing in a primary coil of the insulation transformer to which the pulsating-current voltage is supplied, whereby current induced across a secondary coil of the insulation transformer is rectified and smoothed, and the DC current is supplied to the load.

The drive control unit varies the duty ratio of a drive pulse according to the load current detected by the current detecting unit and thereby varies the drive period of the switching element, whereby the improvement of load regulation is implemented. The input voltage detecting unit varies the duty ratio of the drive pulse according to a variation in the AC voltage detected through the insulation transformer, whereby the improvement of line regulation is implemented.

The regulation of duty ratio of the drive pulse according to a variation in the AC voltage is implemented as follows.

The drive control unit includes a control unit and a drive unit. The control unit includes an amplification converting circuit and a reference voltage generating circuit. The reference voltage generating circuit generates reference voltage used as a reference for generating a duty ratio regulating signal and supplies the reference voltage to the amplification converting circuit of the control unit.

The reference voltage is corrected by the reference voltage generating circuit which receives the output of the input voltage detecting unit; and the amplification converting circuit generates based on the reference voltage, a duty ratio regulating signal. The drive unit sets based on the duty ratio regulating signal, the duty ratio of the drive pulse.

A reference voltage correcting circuit outputs a voltage dependent on the variation of the AC voltage, and the output voltage of a variable voltage source of the reference voltage generating circuit is regulated by the output voltage from the reference voltage correcting circuit, whereby the reference voltage is corrected depending on the variation in the AC voltage.

Alternatively, the reference voltage correcting circuit outputs a voltage dependent on the variation of the AC voltage, and an adding circuit included in the control unit adds the output voltage of a constant-voltage source to the output voltage of the reference voltage correcting circuit and outputs the resultant voltage as the reference voltage (the reference voltage is corrected depending on the variation in the AC voltage).

In the case of the switching power supply device having the above described configuration, when the AC voltage is varied in a range of 187%, the rate of variation of the DC current supplied to the load can be reduced to less than 0.83% to 2.5% (resulting in the improvement in power supply stability); or when the AC voltage is varied in a range of 100%, the rate of variation of the DC current supplied to the load can be reduced to less than 0.4% to 2.5%.

In the case of an LED lighting device in which the switching power supply device drives a load of LED, the LED is driven by use of a predetermined current in any country or region where AC input voltage of a different level is used.

When the switching power supply device and the LED lighting device according to the present invention are used, a predetermined power supply stability can be implemented with respect to commercial power lines of different voltages (for example, commercial power lines which supply AC voltage of 100V system, 200V system or the like). Consequently, design cost, manufacturing cost and the like of the switching power supply device and the LED lighting device are reduced.

DETAILED DESCRIPTION OF THE PREFERRED EMBODIMENTS

Figure 1:
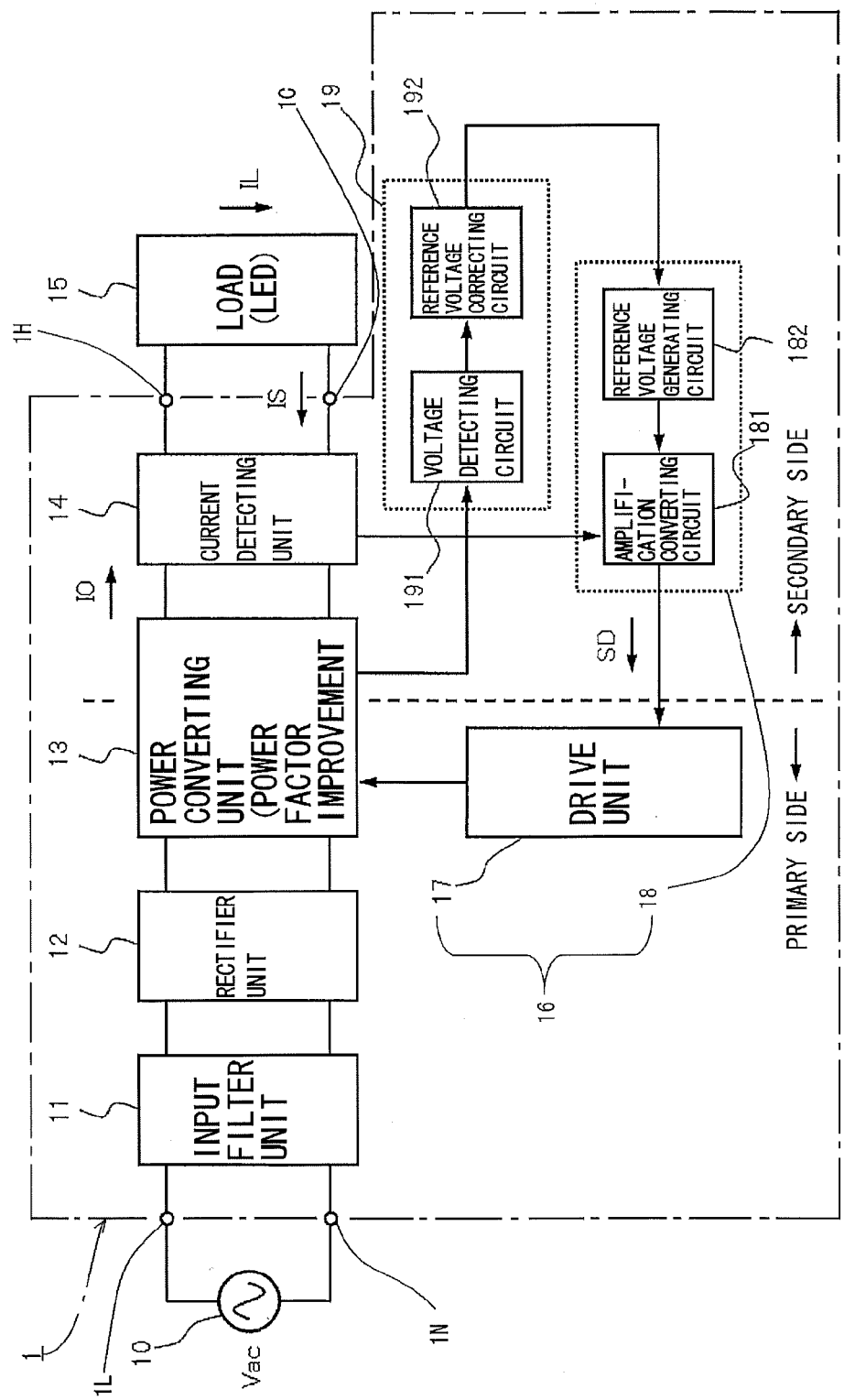
FIG. 1 is a schematic block diagram in an embodiment (Embodiment 1) of a switching power supply device according to the present invention.
Figure 2:
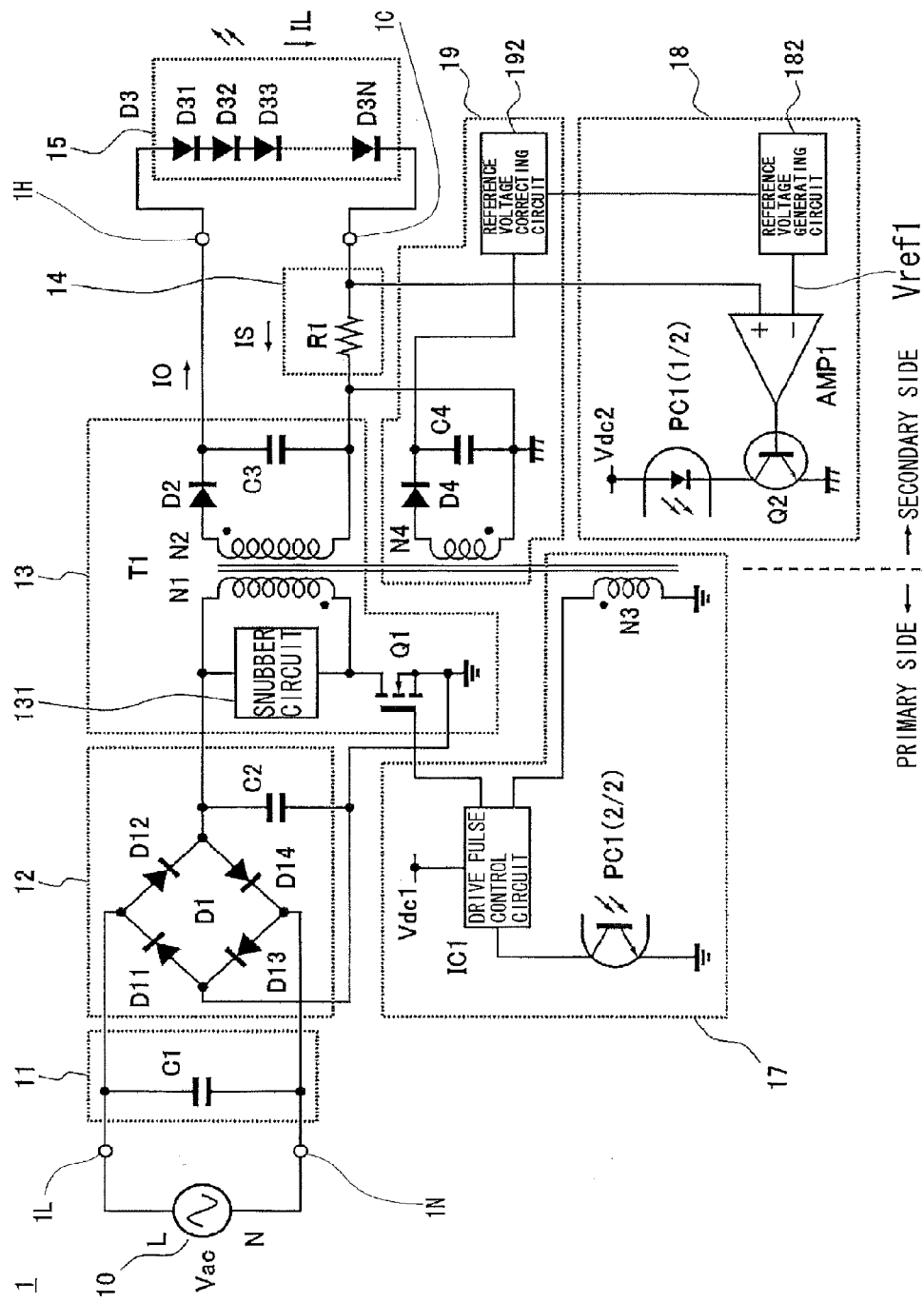
FIG. 2 is a view illustrating an example of schematic circuit configuration of the switching power supply device illustrated in FIG. 1.

A switching power supply device according to the present invention will be described below with reference to the drawings. FIG. 1 is a schematic block diagram of a switching power supply device 1 according to the present invention; FIG. 2 is a view illustrating a schematic circuit configuration of the switching power supply device 1.

The switching power supply device 1 includes, as illustrated in FIGS. 1 and 2, an input filter unit 11, a rectifier unit 12, a power converting unit 13, a current detecting unit 14, a drive control unit 16 (including a drive unit 17 and a control unit 18), and an input voltage detecting unit 19. At input terminals 1L and 1N, electric power of voltage Vac is received from an AC power line 10 being a commercial power line; and load current IL is supplied to a load 15 (for example, a light-emitting diode (LED)). The control unit 18 includes an amplification converting circuit 181 and a reference voltage generating circuit 182; and the input voltage detecting unit 19 includes a voltage detecting circuit 191 and a reference voltage correcting circuit 192.

The input filter unit 11, the rectifier unit 12, an input-side circuit (described later) of the power converting unit 13, and the drive unit 17 used to drive a switching element constitute a primary-side component of the switching power supply device 1. An output-side circuit (described later) of the power converting unit 13, the current detecting unit 14, the control unit 18, and the input voltage detecting unit 19 constitute a secondary-side component of the switching power supply device 1. An insulation transformer T1 is disposed between the primary side and the secondary side of the switching power supply device 1.

<Conversion of AC Power to DC Power>

In the switching power supply device 1, AC input voltage Vac is, as illustrated in FIG. 2, rectified by a first rectifying element D1 (a diode bridge constituted of diodes D11 to D14) of the rectifier unit 12, and is changed to pulsating-current voltage (pulsating-current power) by a first smoothing capacitor C2. The power converting unit 13 includes the insulation transformer T1, the input-side circuit, the output-side circuit, and a second smoothing capacitor C3; the pulsating-current power supplied from the rectifier unit 12 is converted to DC power by the power converting unit 13, and the DC power is supplied to the load 15.

The insulation transformer T1 includes a primary coil N1 and a secondary coil N2, and these coils are electrically insulated from each other. In the input-side circuit of the power converting unit 13, the primary coil N1 and a switching element Q1 are connected in series, and the pulsating-current voltage is supplied from the rectifier unit 12 via the primary coil N1 to the switching element Q1. When the switching element Q1 performs a switching operation (ON/OFF operation), a pulse voltage is generated across the primary coil N1. A snubber circuit 131 connected in parallel to the primary coil N1 suppresses an overvoltage transiently generated when the switching element Q1 performs the switching operation.

In the output-side circuit of the power converting unit 13, current is induced across the secondary coil N2 by the pulse voltage applied to the primary coil N1. This current is rectified by a second rectifying element D2 (output-side rectifying element) and then smoothed by the second smoothing capacitor C3 to produce DC voltage. The switching operation of the switching element Q1 is performed using a drive pulse (having a frequency substantially higher than the frequency of AC input) for driving the switching element Q1. In this case, when the duty ratio of the drive pulse is varied, the average level (being equal to or substantially equal to DC output current IO)) of the current across the secondary coil N2 is regulated. In other words, the power converting unit 13 operates as a switching regulator.

The input filter unit 11 (line capacitor C1) attenuates noises from the AC power line 10 and in addition, attenuates switching noises leaking from the power converting unit 13 to the side of the AC power line 10.

<Constant-Current Drive>

The load 15 (LED load D3 including a number N of LEDs D31 to D3N) is connected between an output terminal 1H (the output terminal of DC output current IO)) and a return terminal 1C (the return terminal of the DC output current IO); DC output current IO supplied to the load 15 returns to an output current detecting resistor R1 of the current detecting unit 14. Consequently, a voltage drop is produced across the output current detecting resistor R1, the voltage drop being the product of DC output current IO and the resistance of output current detecting resistor R1 of the output-side circuit; referring to FIG. 2, it is noted that load current IL flowing in the load 15 and current IS flowing in the output current detecting resistor R1 are both equal to DC output current IO.

The amplification converting circuit 181 (refer to FIG. 1) of the control unit 18 includes, as illustrated in FIG. 2, an amplifier AMP 1, a transistor Q2, and the light emitting element side of a photo coupler PC1. The amplifier AMP 1 compares reference voltage Vref1 (refer to FIG. 3) generated by the reference voltage generating circuit 182 and the voltage drop of the output current detecting resistor R1 and drives the transistor Q2. The transistor Q2 drives the light-emitting element side of the photo coupler PC1 to transmit a duty ratio control signal SD to the light receiving element side of the photo coupler PC1 (the drive unit 17 and the control unit 18 are electrically insulated from each other).

The drive unit 17 includes a drive pulse control circuit IC1 used to drive the switching element Q1, a zero-voltage detecting coil N3 of the insulation transformer T1, and the light receiving element side of the photo coupler PC1. The light receiving element side of the photo coupler PC1 receives the duty ratio control signal SD generated by the amplification converting circuit 181; and the drive pulse control circuit IC1 sets the duty ratio of drive pulse based on the received duty ratio control signal SD. The zero-voltage detecting coil N3 of the insulation transformer T1 detects the zero voltage used to determine the timing of generating a drive pulse.

In this way, the power converting unit 13 operates as a switching regulator using feedback control, in which the voltage drop of the output current detecting resistor R1 is detected relative to reference voltage Vref1 generated by the reference voltage generating circuit 182; thus, DC output current IO is regulated to a predetermined level (that is, the switching power supply device 1 operates as a constant-current supply). Consequently, even when the voltage drop of the load 15 varies due to a temperature variation or the like of the LEDs D31 to D3N, the switching power supply device 1 can regulates to a predetermined level, DC output current IO flowing in the load 15 (that is, load regulation is improved).

<Detection of AC Voltage Variation>

For example, the rise in AC input voltage constitutes a factor of increasing DC output current IO. That is, a variation in AC input voltage disturbs the feedback control system of the power converting unit 13. In the switching power supply device 1, in order to deal with this disturbance, the input voltage detecting unit 19 detects a variation in AC input voltage Vac, whereby a variation in DC output current IO is suppressed (that is, line regulation is improved).

While the pulsating-current voltage outputted from the rectifier unit 12 varies depending on a variation in AC input voltage Vac, a pulse voltage dependent on the pulsating-current voltage outputted from the rectifier unit 12 is applied across the primary coil N1 of the insulation transformer T1. Then, since the voltage induced across a voltage detecting coil N4 depends on the ratio of coil turns between the primary coil N1 and the voltage detecting coil N4 of the insulation transformer T1, a pulse voltage of an amplitude dependent on the variation in AC input voltage Vac is induced across the voltage detecting coil N4.

The voltage detecting circuit 191 (refer to FIG. 1) of the input voltage detecting unit 19 includes the voltage detecting coil N4 of the insulation transformer T1, a fourth rectifying element D4 and a third smoothing capacitor C4; a voltage dependent on the peak value of pulse voltage induced across the voltage detecting coil N4 is applied from the fourth rectifying element D4 to the third smoothing capacitor C4 to charge the third smoothing capacitor C4; it is noted here that when the input resistance of the reference voltage correcting circuit 192 is set substantially high, the rectifying efficiency of the fourth rectifying element D4 becomes close to 1, and thus the voltage of the third smoothing capacitor C4 is hardly affected by the duty ratio of drive pulse.

In this way, the voltage with which the third smoothing capacitor C4 is charged is a DC voltage dependent on the variation in AC input voltage Vac (that is, the input voltage detecting unit 19 detects the variation in AC input voltage Vac). In detecting an AC voltage variation, the voltage detecting coil N4 may not be used. For example, a pulse voltage (a pulse voltage at the connecting point of the primary coil N1 and the switching element Q1) applied across the primary coil N1 may be rectified by the fourth rectifying element D4.

<Reference Voltage Generating Circuit and Reference Voltage Correcting Circuit>

Figure 3:
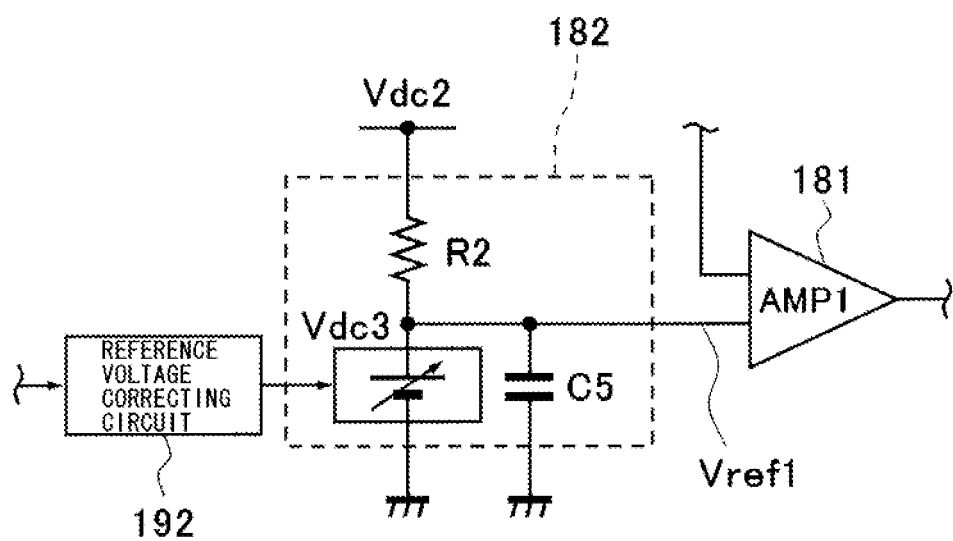
FIG. 3 is a view illustrating an example of schematic circuit configuration of a reference voltage generating circuit included in the switching power supply device illustrated in FIG. 1.

The reference voltage correcting circuit 192 operates as a buffer amplifier of the voltage with which the third smoothing capacitor C4 is charged (refer to FIG. 2) and in addition controls, as illustrated in FIG. 3, a variable-voltage source Vdc3 of the reference voltage generating circuit 182 by use of the output voltage of this circuit. When the reference voltage correcting circuit 192 performs this control, the output voltage (reference voltage Vref1) of the variable-voltage source Vdc3 varies. In this way, reference voltage Vref1 corrected according to a variation in AC input voltage Vac is supplied to the amplification converting circuit 181 of the control unit 18.

Referring to FIG. 3, due to a resistor R2 connected between the reference voltage generating circuit 182 and a DC voltage Vdc2, a predetermined current flows in the variable-voltage source Vdc3; and a capacitor C5 connected to the output side of the variable-voltage source Vdc3 is a bypass capacitor used to remove noises or the like.

Figure 4:
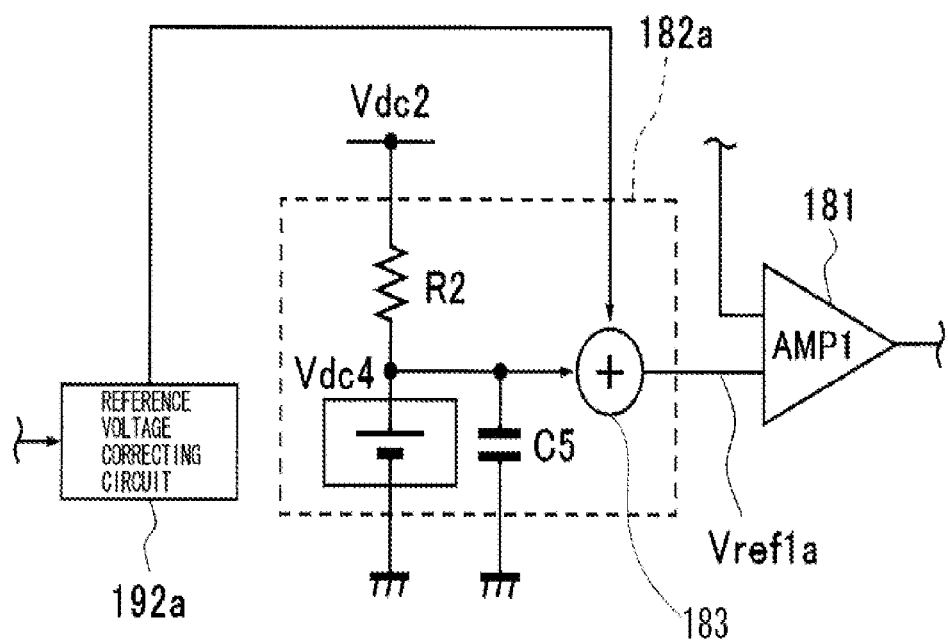
FIG. 4 is a view illustrating another example of another schematic circuit configuration of the reference voltage generating circuit included in the switching power supply device illustrated in FIG. 1.

FIG. 4 is a variation (reference voltage generating circuit 182a) of the reference voltage generating circuit. In this case, a reference voltage correcting circuit 192a operates, similarly to the reference voltage correcting circuit 192, as a buffer amplifier. The reference voltage generating circuit 182a includes a constant-voltage source Vdc4 and an adding circuit 183. The adding circuit 183 adds the output voltage of the constant-voltage source Vdc4 and the output voltage of the reference voltage correcting circuit 192a, and outputs reference voltage Vref1a. Thus, reference voltage Vref1a is corrected depending on a variation in AC input voltage Vac (reference voltage Vref1a is inputted to the amplification converting circuit 181).

<Improvement in Line Regulation>

The power converting unit 13 is feedback-controlled to reduce the voltage difference between the voltage drop of the output current detecting resistor R1 and reference voltage Vref1, whereby DC output current IO is regulated to a predetermined level. As for power supply stability, the feedback control system is typically designed with a voltage variation (+10% to −10% (variation range: 20%)) of the commercial power line in mind. However, when a power supply having such power supply stability is operated, for example, using the commercial power line of 100V or of 230V, the variation range becomes 130% (slightly greater than six times the variation range of 20%) and thus the variation in DC output current IO becomes slightly greater than six times (power supply stability being lower than one sixth); consequently, the allowable range of variation in DC output current IO is exceeded (that is, the required power supply stability cannot be achieved).

To deal with such a wide range of variation in AC input voltage Vac, the reference voltage Vref1 in the switching power supply device 1 is corrected depending on the variation of AC input voltage Vac; consequently, DC output current IO is regulated to a predetermined level (adverse effects of disturbance by the rise in AC input voltage exerted on the feedback control system are reduced).

Of course, when the variable-voltage source Vdc3 is controlled by the reference voltage correcting circuit 192, the control gain and polarity is set so that adverse effects of disturbance by the rise in AC input voltage exerted on the feedback control system are reduced; the addition of the output voltage of the constant-voltage source Vdc4 to the output voltage of the reference voltage correcting circuit 192a is similarly performed (that is, the adding circuit 183 may operate substantially as a subtraction circuit).

Figure 5:
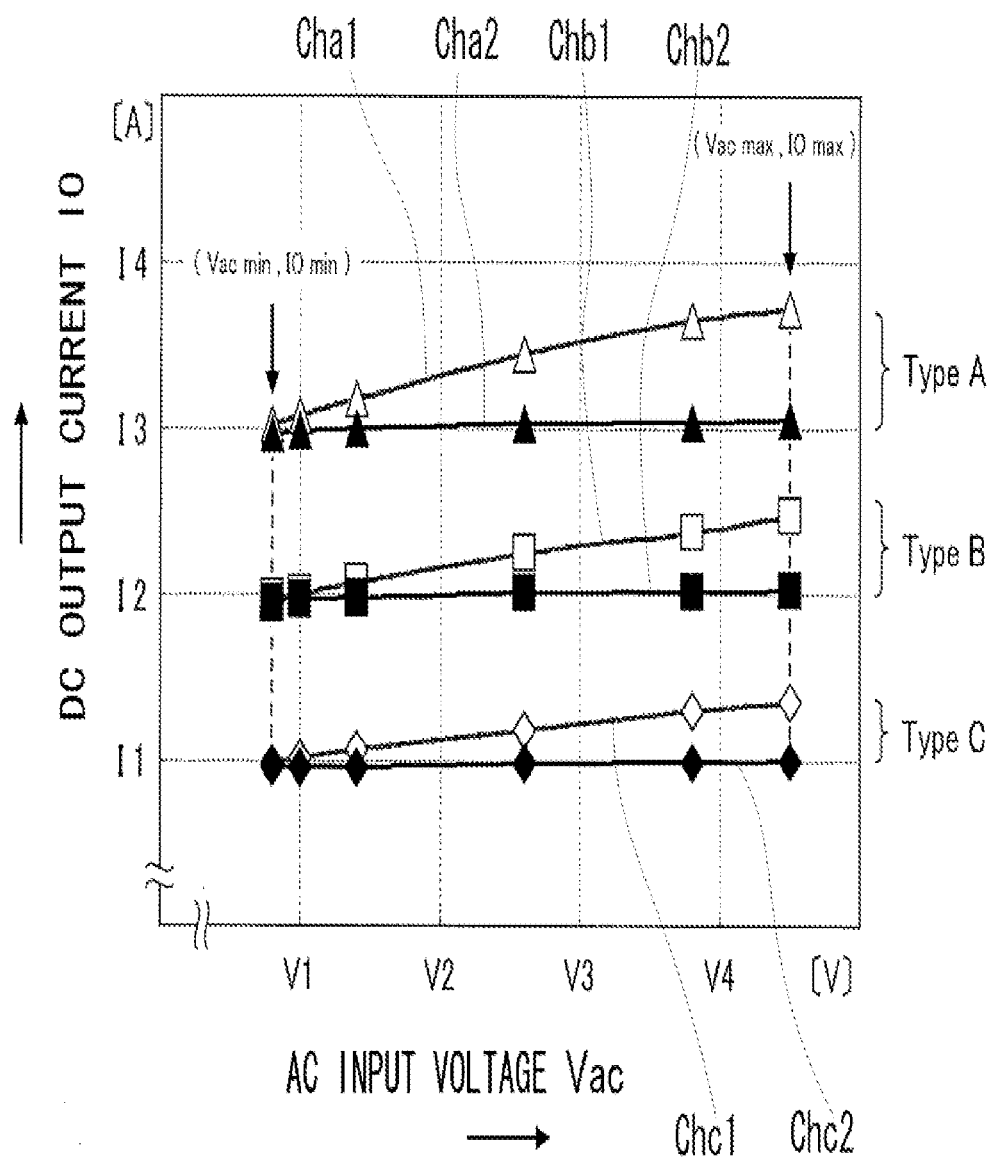
FIG. 5 is a graph showing an example of line regulation of the switching power supply device illustrated in FIGS. 1 and 2.

FIG. 5 is a graph showing an example of line regulation of the switching power supply device 1; herein, variation characteristics of load current IL with respect to the variation in AC input voltage are graphed.

In the graph of FIG. 5, the ordinate represents DC output current IO (=load current IL), wherein I1=0.8 A, I2=1.0 A, I3=1.2 A and I4=1.4 A. The abscissa represents AC input voltage Vac, wherein V1=100V, V2=150V, V3=200V and V4=250V. FIG. 5 shows variation characteristics of load current IL with respect to the variation in AC input voltage, when three types of the switching power supply devices 1 are used, that is, DC output current IO is set to 1.2 A(=I3: type A) or to 1.0 A(=I2: type B) or 0.8 A(=I1: type C).

In the three types of the switching power supply devices 1, setting is done so that a predetermined level of DC output current IO is provided at a minimum voltage of 90V; and DC output current IO is measured when AC input voltage Vac is varied from the minimum voltage of 90V to a maximum voltage of 277V. In this case, the rate of variation in AC input voltage Vac in a downward direction is 10% relative to 100V, and the rate of variation in AC input voltage Vac in an upward direction is 177% ((277−100)/100=177%); the total rate of variation is 187%, which is greater than 9 times the rate of 20%.

<Improvement in Power Supply Stability Against the Variation in Voltage of AC Input Voltage from 90V to 277V>

In type A, according to variation characteristic Cha1 when the detection of AC voltage variation is not performed (when the reference voltage is not corrected), DC output current IO is approximately 1.35 A at the maximum voltage of 277V (since DC output current IO is 1.2 A at the minimum voltage of 90V, the rate of variation is approximately 12.5%). However, according to variation characteristic Cha2 when AC voltage variation is detected to correct the reference voltage, DC output current IO is approximately 1.21 A at the maximum voltage of 277V (that is, the rate of variation is approximately 0.83%). More specifically, the power supply stability of the switching power supply device 1 becomes approximately 15 times as high (12.5/0.83≈15).

<Improvement in Power Supply Stability Against the Variation in Voltage of AC Input Voltage from 90V to 200V>

According to variation characteristic Cha1 (when the detection of AC voltage variation is not performed), DC output current IO is approximately 1.31 A at the AC input voltage of 200V (the rate of variation relative to the minimum voltage of 90V being slightly greater than 100%); since DC output current IO is 1.2 A at the minimum voltage of 90V, the rate of variation is approximately 9.2%. However, according to variation characteristic Chat (when AC voltage variation is detected to correct the reference voltage), DC output current IO is approximately 1.205 A at the AC input voltage of 200V (that is, the rate of variation is approximately 0.4%). In this case, the power supply stability of the switching power supply device 1 becomes approximately 23 times as high (9.2/0.4=23).

As evident from the above description, in the switching power supply device 1, even when AC input voltage Vac varies 100% (when AC input voltage Vac becomes twice as high or one half), the rate of variation can be reduced to approximately 0.4% or less.

<Allowable Range of Power Supply Stability>

In type A, according to variation characteristic Cha1 (when the detection of AC voltage variation is not performed), the rate of variation in DC output current IO is approximately 2.5% at a voltage of 110V. This rate of variation is greater than the rate of variation of approximately 0.4% in DC output current IO when the variation in AC input voltage Vac is 100% in the case where AC voltage variation is detected to correct the reference voltage.

On the assumption that the rate of variation of 2.5% in DC output current IO is allowable with respect to the variation of +10% to −10% in AC input voltage Vac of 100V system, it is sufficient to achieve this rate of variation of 2.5% when the rate of variation in AC input voltage Vac is 187% (for example, when AC input voltage Vac varies in a range from 90V to 277V).

Or, it is sufficient to achieve the rate of variation of 2.5% in DC output current IO when the rate of variation in AC input voltage Vac is 100% (for example, when AC input voltage Vac varies in a range from 100V to 200V).

In type B, when variation characteristic Chb1 (without detection of variation in AC voltage) is compared to variation characteristic Chb2 (with detection of variation in AC voltage), it is evident that the stability of DC output current IO is improved similarly to type A. Further, in type C, when variation characteristic Chc1 (without detection of variation in AC voltage) is compared to variation characteristic Chc2 (with detection of variation in AC voltage), it is evident that the stability of DC output current IO is improved similarly to type A and type B.

In this way, in the switching power supply device 1, load regulation as well as line regulation can be improved with respect to a wide range of AC input voltage and thus a predetermined power supply stability can be implemented with respect to a wide range of AC input voltage. Consequently, when the present invention is applied, switching power supply devices do not need to be provided for each 100V-system market or for each 200V-system market, thus allowing reduction in design cost, manufacturing cost, maintenance-parts cost and the like for the switching power supply.

<LED Lighting Device>

When the switching power supply device 1 is integrated with the LED load D3, an LED lighting device for driving the LED load D3 can be implemented (it can be said that FIG. 2 illustrates an exemplary schematic circuit configuration of such LED lighting device).

The inventive LED lighting device can drive the LED using a predetermined current in countries or regions different in AC input voltage. Accordingly, design cost, manufacturing cost, maintenance-parts cost and the like for the LED lighting device can be reduced; a high market competitiveness can be implemented.

The switching power supply device and the LED lighting device according to the present invention are not to be limited to the configurations illustrated in the aforementioned embodiments, and certain changes and modifications to the embodiments may be practiced without departing from the gist of the invention.

For example, the constituent components of the control unit and the input voltage detecting unit may be constituted of not an analogue circuit but a digital circuit. For example, the reference voltage generating circuit, the reference voltage correcting circuit, the adding circuit and the like may be constituted of an arithmetic unit, such as a microcomputer, which is program-controlled; in this case, the variation in AC input voltage Vac and the voltage drop of the output current detecting resistor are converted into digital data by an analog-digital converter. The drive pulse control circuit may also be constituted of a microcomputer or the like.

Further, a PFC switching regulator (or a switching regulator with power factor improvement) may be used for the power converting unit 13. The above description is about a case where LEDs are used as the load, but the load, driven by constant current, is not limited to LEDs.

The switching power supply device and the LED lighting device according to the present invention can be industrially manufactured and used, and can also be commercially dealt. Accordingly, the present invention, having economic values, is industrially applicable.

DESCRIPTION OF SYMBOLS

1 switching power supply device
10 AC power line
12 rectifier unit
13 power converting unit
14 current detecting unit
15 load
16 drive control unit
17 drive unit
18 control unit
181 amplification converting circuit
182, 182a reference voltage generating circuit
183 adding circuit
19 input voltage detecting unit
191 voltage detecting circuit
192, 192a reference voltage correcting circuit
C3 second smoothing capacitor (output-side smoothing capacitor)
D2 second rectifying element (output-side rectifying element)
D3 light-emitting diode load
IL load current
IO DC output current (DC current)
N1 primary coil of insulation transformer
N2 secondary coil of insulation transformer
Q1 switching element
T1 insulation transformer
Vac AC input voltage (AC voltage)
Vdc3 variable-voltage source
Vdc4 constant-voltage source

What is claimed is:

1. A switching power supply device comprising:
a rectifier unit which rectifies AC voltage received from an AC power line and outputs pulsating-current voltage;
a power converting unit which receives the pulsating-current voltage and supplies a predetermined DC current to a load;
a current detecting unit which detects load current flowing in the load;
an input voltage detecting unit which detects a variation in the AC voltage; and
a drive control unit which, in order to regulate the load current to a constant level, controls the power converting unit depending on a variation in the load current detected by the current detecting unit and at the same time, in order to suppress a variation in the DC current caused by the variation in the AC voltage, controls the power converting unit depending on the variation in the AC voltage detected by the input voltage detecting unit.

2. The switching power supply device according to claim 1, wherein the power converting unit includes an insulation transformer; an input-side circuit including a primary coil of the insulation transformer to which the pulsating-current voltage is supplied, and a switching element which performs a switching operation on current flowing in the primary coil; an output-side circuit including an output-side rectifying element which rectifies current flowing in a secondary coil of the insulation transformer; and an output-side smoothing capacitor which smoothes the current rectified by the output-side rectifying element, wherein the drive control unit generates a drive pulse of a duty ratio varying depending on the load current detected by the current detecting unit and drives the switching element so that the DC current supplied to the load is regulated to a constant level, wherein the input voltage detecting unit detects the variation in the AC voltage through the insulation transformer, and, wherein the drive control unit varies the duty ratio of the drive pulse depending on the variation in the AC voltage, thereby suppressing the variation in the DC current caused by the variation in the AC voltage.

3. The switching power supply device according to claim 2, wherein the drive control unit includes a control unit which includes an amplification converting circuit generating a duty ratio control signal used to vary the duty ratio of the drive pulse and a reference voltage generating circuit generating a reference voltage for generating the duty ratio control signal and supplying the reference voltage to the amplification converting circuit; and a drive unit which sets the duty ratio of the drive pulse based on the duty ratio control signal and outputs the drive pulse to the switching element, and, wherein the reference voltage generating circuit corrects the reference voltage depending on the variation in the AC voltage detected by the input voltage detecting unit.

4. The switching power supply device according to claim 3, wherein the input voltage detecting unit includes a reference voltage correcting circuit which outputs a voltage dependent on the variation in the AC voltage, and, wherein the control unit includes a variable-voltage source which outputs a voltage regulated by the reference voltage correcting circuit, and the amplification converting circuit receives the output voltage of the variable-voltage source as the reference voltage and generates the duty ratio regulating signal.

5. The switching power supply device according to claim 3, wherein the input voltage detecting unit includes a reference voltage correcting circuit which outputs a voltage dependent on the variation in the AC voltage, and, wherein the control unit includes a constant-voltage source and an adding circuit which adds an output voltage of the reference voltage correcting circuit to an output voltage of the constant-voltage source, and the amplification converting circuit receives the output voltage of the adding circuit as the reference voltage and generates the duty ratio regulating signal.

6. A light-emitting diode lighting device comprising:
a switching power supply device; and
one or more light-emitting diodes connected between a DC current output terminal and a DC current return terminal of the switching power supply device,
wherein
the switching power supply device is the switching power supply device according to claim 1.

7. A light-emitting diode lighting device comprising:
a switching power supply device; and
one or more light-emitting diodes connected between a DC current output terminal and a DC current return terminal of the switching power supply device,
wherein
the switching power supply device is the switching power supply device according to claim 2.

8. A light-emitting diode lighting device comprising:
a switching power supply device; and
one or more light-emitting diodes connected between a DC current output terminal and a DC current return terminal of the switching power supply device,
wherein
the switching power supply device is the switching power supply device according to claim 3.

9. A light-emitting diode lighting device comprising:
a switching power supply device; and
one or more light-emitting diodes connected between a DC current output terminal and a DC current return terminal of the switching power supply device,
wherein
the switching power supply device is the switching power supply device according to claim 4.

10. A light-emitting diode lighting device comprising:
a switching power supply device; and
one or more light-emitting diodes connected between a DC current output terminal and a DC current return terminal of the switching power supply device,
wherein
the switching power supply device is the switching power supply device according to claim 5.

* * * * *